(No Model.) 2 Sheets—Sheet 1.
B. A. CAPEHART.
EYEGLASSES.
No. 457,253. Patented Aug. 4, 1891.
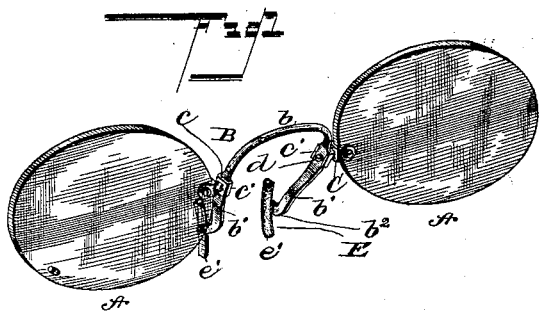
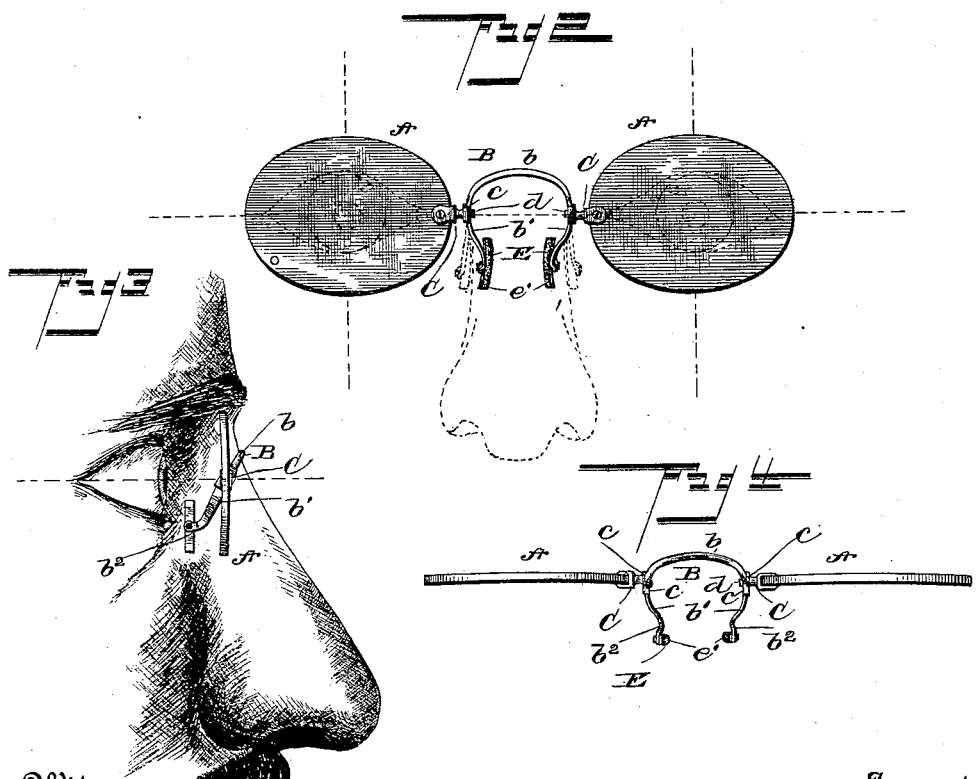
Witnesses
John Smirl
Franklin Moore
Inventor
B A Capehart
By his Attorney
J R Littell

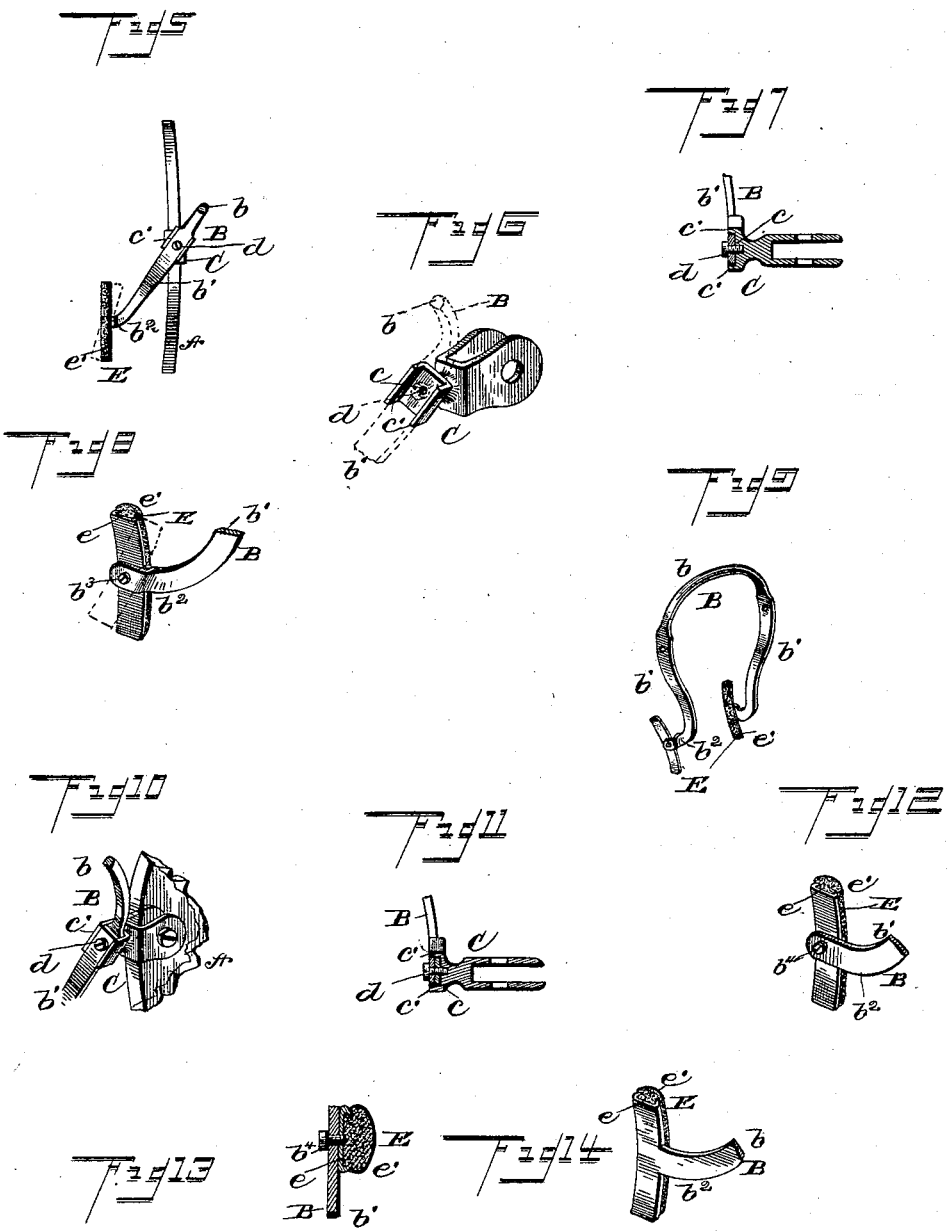

UNITED STATES PATENT OFFICE.

BALDY ASHBOURNE CAPEHART, OF WASHINGTON, DISTRICT OF COLUMBIA, ASSIGNOR OF ONE-HALF TO R. L. MAGRUDER, OF SAME PLACE.

EYEGLASSES.

SPECIFICATION forming part of Letters Patent No. 457,253, dated August 4, 1891.

Application filed September 13, 1890. Serial No. 364,820. (No model.)

*To all whom it may concern:*

Be it known that I, BALDY ASHBOURNE CAPEHART, a citizen of the United States, residing at Washington, in the District of Columbia, have invented certain new and useful Improvements in Eyeglasses; and I do hereby declare that the following is a full, clear, and exact description of the invention, which will enable others skilled in the art to which it appertains to make and use the same.

This invention relates to that class of eyeglasses which are designed especially for use in cases requiring astigmatic lenses or perfect "centering" and which employ for this purpose a construction embodying a rigid connection between the lenses in lieu of the ordinary spring usually employed.

The object of my invention is to provide simple and improved eyeglasses of this character which will possess advantages in point of simplicity and inexpensiveness in construction, facility and convenience in adjustment, durability and general efficiency in use, which will effectively and positively retain the lenses in a perfectly-centered and proper position, and which will in all respects serve as an effective substitute for spectacle-frames or other more complicated and expensive constructions.

Heretofore in the case of lenses or glasses which require perfect centering it has been customary to employ spectacle-frames owing to the difficulties experienced in securing a positive and fixed adjustment of the lenses when mounted in eyeglass-frames; but it is a well-known fact that eyeglasses are usually and generally preferred in view of their more convenient adjustment for use and removal and transportation. Various constructions of eyeglass-frames have been heretofore devised as a substitute for spectacles in this relation; but these constructions are in the main more or less complicated and cumbersome and have not usually been adapted to perfectly perform the office and function of spectacles. My invention is therefore designed to overcome these objections and provide simple and improved eyeglasses which will serve as an efficient and effective substitute for spectacles and maintain the perfect centering and position of the lenses, which is essential in astigmatic and other cases.

In the drawings, Figure 1 is a perspective view illustrating my invention. Fig. 2 is a front view showing the glasses in position. Fig. 3 is a side view showing the glasses in position. Fig. 4 is a top view of the glasses. Fig. 5 is a sectional view taken through the bridge. Figs. 6, 7, and 8 are detail views illustrating the construction. Fig. 9 is a detail perspective view of the bridge. Fig. 10 is a perspective view illustrating a modification. Fig. 11 is a detail sectional view of said modification. Fig. 12 is a detail view illustrating another modification. Fig. 13 is a sectional view of the latter modification. Fig. 14 is a detail view illustrating another method of construction.

Corresponding parts in all the figures are denoted by the same letters of reference.

Referring to the drawings, A designates the lenses, which may be of any usual or desired construction and which are connected by the bridge-piece B comprised in my invention. The bridge-piece B is of approximately inverted-U shape, and may be formed of steel or other suitable material. It comprises the bridge proper $b$ and two depending arms $b'$ $b'$. The lenses are respectively secured to the bridge-piece, preferably at the junction of the bridge proper with the depending arms, in any suitable manner.

In the construction herein shown frames for the lenses are entirely dispensed with, the best results in glasses of this character being secured by this arrangement, and at the inner edges of the lenses is provided a knob or seat C, having in its inner face a flat recess $c$, which receives the corresponding flat portion of the bridge-piece at the junction of the bridge proper with the depending arms, as shown, the parts being secured together by a screw $d$, passing through the bridge-piece and into the knob or seat, and pivotal movement or displacement being prevented by engagement of the edges of the bridge-piece with the flanges $c'$ $c'$, formed by the recess $c$. The recesses $c$ are preferably at an angle of about forty-five degrees with relation to the perpendicular plane of the lenses, to correspond to the angle of the bridge-piece, as hereinafter described.

The bridge proper $b$ is rigid and secured against vertical or lateral movement of the lenses and against movement of the lenses in any manner whatever with relation to the bridge-piece, the lenses and the bridge-piece forming my invention and connecting the same being thus absolutely fixed in position with relation to each other. The arms $b'$ $b'$, depending from the fixed rigid bridge proper $b$, are flat spring-arms, and normally converge or project inwardly approximately toward each other, as shown in the drawings, for the more effectual clamping of the glasses upon the nose of the wearer. These spring arms project from the rigid bridge proper on substantially the same plane and at the same angle as the plane and angle of the bridge proper is with relation to the perpendicular plane of the lenses.

As before indicated, the bridge-piece—that is, the rigid bridge proper $b$ and the depending spring-arms $b'$ $b'$—is disposed at an angle with relation to the perpendicular plane of the lenses, this angle being, preferably, about forty-five degrees, so that the rigid bridge proper $b$ projects forwardly from the plane of the front surface of the lenses, while the spring-arms $b'$ $b'$ project rearwardly from the plane of the rear face of the lenses, and the connection between the lenses and the bridge-piece is preferably formed at about the center of the inner edges of the lenses, as shown, the connection thus being on approximately a horizontal plane passing through the center of the lenses. By this construction and general relative arrangement the most perfect adaptability with relation to the bearing and position of the glasses upon the nose of the wearer and the centering of the lenses before the eye in astigmatic or other glasses are secured, it being understood that the rigid bridge proper $b$ passes over the bridge of the nose of the wearer and is preferably fitted to rest over and against the same, while the spring-arms $b'$ $b'$ are adapted to bind or clamp the sides of the nose and retain the glasses, the construction and angle of the bridge-piece permitting of this adjustment, and at the same time serving to retain the lenses themselves in a perpendicular position and perfectly centered before the eyes of the wearer.

I prefer, ordinarily, to construct my improved bridge-piece of a single piece or strip of steel or other metal, the central portion forming the bridge proper $b$ being formed rigid, while the arms are extended from the ends of the rigid portion and tempered or adapted for the spring office referred to; but as a modification of this construction the component parts of my improved bridge-piece may be constructed separately, the rigid bridge proper $b$ being formed in one piece and the depending spring-arms $b'$ $b'$ being formed of separate pieces, the parts being connected by the fastenings at the point where the lenses are secured to the bridge-piece, this modification being illustrated in Figs. 10 and 11 of the drawings.

Upon the ends of the spring-arms are provided suitable cushions or other devices, which come against the nose. These cushions may be in the main of any usual or well-known construction; but I preferably employ a curved seat $e$, in which is set a strip of cork $e'$. The cushions E E are mounted at an angle to the plane of inclination of the bridge-piece, their position preferably approximating or corresponding somewhat to the perpendicular plane of the lenses, and the extreme ends of the spring-arms are preferably turned or curved rearwardly, as shown at $b^2$, to enable the proper relative location of the cushions. The cushions are preferably pivotally mounted upon the ends of the spring-arms by means of a pivot-pin or screw $b^3$, as shown in the drawings, so that they may more readily accommodate themselves to variations in the shape of the nose; but they may be fixed or secured rigidly to the ends of the spring-arms, if desired.

The operation and advantages of my invention will be readily understood by occulists, opticians, and others skilled in the art to which it appertains.

My improved construction and arrangement of parts secures a comfortable and convenient adjustment and retention of the glasses upon the nose of the wearer and retains the lenses in proper perpendicular position with relation to the eyes, the proper centering of the glasses being also assured by the positively-fixed position of the lenses with relation to the bridge-piece, no movement whatever nor displacement of the lenses from their fixed position with relation to the bridge-piece being possible; and it is therefore apparent that eyeglasses constructed according to my invention are adapted to effectively and efficiently serve as a full substitute for spectacles or more complicated constructions in occulist's prescriptions for astigmatic glasses or other lenses requiring a positive position and perfect centering with relation to the eyes.

While I prefer in connection with my invention to employ lenses without rims or frames, it is obvious that any usual construction or arrangement of rims or frames may be employed, if desired, in which case the knobs or seats C would be provided upon the rim.

In cases where the cushions are pivotally mounted upon the rearwardly-turned ends $b^2$ of the arm $b$ by means of the ordinary pivot or screw $b^3$, it is desirable to employ some suitable construction for limitng the pivotal play of the cushions, and for this purpose a bend or shoulder may be formed in the rearwardly-turned end portion $b^2$ of the spring-arm $b$, as shown, or any other suitable or adapted means may be provided. As a modification of this pivotal arrangement of the cushions I have shown in Figs. 12 and 13 a construction in which the cushion is mounted upon the rearwardly-turned end $b^2$ of the spring-arm $b$ by means of a clamping-screw $b^4$, which is adapted to tightly bind the cushion against the end of the spring-arm and securely retain the former in position at the angle to which it has been previously adjusted. By this last-described construction the optician can by loosening the screw adjust the position of the cushion to the proper angle with relation to the shape of the nose of the wearer, after which the screw is tightened to securely retain the cushion permanently in position at the proper angle of adjustment.

A further modification is illustrated in Fig. 14, in which the end $b^2$ of the spring-arm $b$ is continued to form the seat $e$ for the cushion $e'$, the cushion-seat thus being integral with the spring-arm in this form of construction.

I do not wish to be understood as limiting myself to the exact construction and arrangement of the parts herein shown and specified, as apparent modifications may be made, particularly in the minor details of the construction and connection of the various parts, without departing from the spirit and scope of my invention or the terms of my claims.

Having thus described my invention, I claim and desire to secure by Letters Patent of the United States—

1. In eyeglasses, the lenses carrying knobs or seats with angularly-arranged sockets thereon, a rigid bridge terminating in integral flattened spring-arms fitted to and secured in said sockets to project the same backward at an angle, and pads carried by the said arms, substantially as described.

2. Eyeglasses having the bridge portion arranged obliquely to the lenses, said angularly-disposed bridge portion comprising a rigid bridge proper and flattened spring-arms extending from the termini of the rigid bridge proper and adapted to carry pads, substantially as and for the purpose set forth.

3. In eyeglasses, the lenses carrying knobs or seats with angularly-arranged sockets, and a bridge portion arranged obliquely to the lenses and fitted in said sockets, said angularly-disposed portion comprising a rigid bridge proper and flattened spring-arms extended from the termini of the rigid bridge proper, whereby the rigid bridge and spring-arms comprising the bridge portion respectively project forwardly and rearwardly from the plane of the lenses and at an angle thereto, substantially as and for the purpose set forth.

4. As an improvement in eyeglasses, a bridge portion comprising a rigid bridge proper and flattened spring-arms adapted to carry pads and extending from the termini of the rigid bridge proper, substantially as and for the purpose set forth.

In testimony whereof I affix my signature in presence of two witnesses.

B. ASHBOURNE CAPEHART.

Witnesses:
J. REED LITTELL,
R. L. MAGRUDER.